United States Patent
Roth et al.

(10) Patent No.: US 7,270,891 B2
(45) Date of Patent: Sep. 18, 2007

(54) MIXED GERMANIUM-SILICON THERMAL CONTROL BLANKET

(75) Inventors: James A. Roth, Redondo Beach, CA (US); James T. Hall, Torrance, CA (US); Dennis G. Neal, Rancho Palos Verdes, CA (US); Craig R. Wilkinson, Torrance, CA (US); Steven Lai, La Verne, CA (US); Mark W. Johnson, La Canada Flintridge, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 365 days.

(21) Appl. No.: 10/990,731

(22) Filed: Nov. 17, 2004

(65) Prior Publication Data

US 2006/0105196 A1  May 18, 2006

(51) Int. Cl.
C23C 14/14 (2006.01)
C23C 14/20 (2006.01)
C23C 14/34 (2006.01)
B32B 15/00 (2006.01)
B32B 15/08 (2006.01)

(52) U.S. Cl. .................. 428/640; 428/411.1; 428/457; 204/192.1

(58) Field of Classification Search ..................... None
See application file for complete search history.

(56) References Cited

U.S. PATENT DOCUMENTS 6,279,857 B1    8/2001   Roth
6,448,622 B1 *  9/2002   Franke et al. ............... 257/415
6,613,393 B1    9/2003   Rauschnabel et al.
6,716,321 B2 *  4/2004   Gilmore et al. .......... 204/192.1
2004/0240374 A1* 12/2004  Tajima et al. ............. 369/275.4
2005/0153476 A1*  7/2005  Park et al. ..................... 438/98
2005/0202653 A1*  9/2005  Joshi et al. ................. 438/479

FOREIGN PATENT DOCUMENTS

JP    04 136901    11/1992

OTHER PUBLICATIONS

D.G. Zimcik et al.; Plasma-Deposited Protective Coatings for Spacecraft Applications; Journal of Spacecrafts and Rockets; Nov. 1991; pp. 652-657; vol. 28, No. 6; American Institute of Aeronautics and Astronautics, Inc.; Ontario, Canada.

* cited by examiner

Primary Examiner—Jennifer McNeil
Assistant Examiner—Jason L. Savage
(74) Attorney, Agent, or Firm—Carmen B. Patti & Assoc., LLC

(57) ABSTRACT

A passive thermal control blanket and a method for its manufacture, the blanket including a plastic substrate on which is deposited a film that is a homogeneous mixture of silicon and germanium, thereby combining the excellent reflective and electrostatic discharge properties of germanium with the superior adhesion and corrosion resistance properties of silicon. The uniform mixture is preferably obtained by sputtering the two materials simultaneously onto the substrate, using either separate targets, a single mosaic target, or a single composite target.

9 Claims, 2 Drawing Sheets

MIXED GERMANIUM-SILICON THERMAL CONTROL BLANKET

BACKGROUND OF THE INVENTION

This invention relates generally to thermal control blankets and, more particularly, to thermal control blankets used in spacecraft to reflect solar radiation, permit emission of radiation, and thereby prevent spacecraft payloads from being excessively heated. Blankets of this general type are often constructed by depositing on a substrate a coating that is reflective in the visible radiation spectrum. The substrate typically has a high emissivity in the mid- to far-infrared (IR) spectrum, because the bulk of the energy emitted from a spacecraft is from the infrared spectrum, at wavelengths greater than 1,000 nm.

U.S. Pat. No. 6,279,857 issued to James A. Roth and assigned to the same assignee as the present invention, describes the advantages of a silicon coating on a thermal control blanket. In brief, although silicon is not as good as germanium in reflecting energy in the visible spectrum, silicon is often preferred because it has better adhesion properties in relation to typical substrate materials, such as Kapton. As also mentioned in the Roth patent, germanium has the advantage of providing greater reflectivity than silicon, but it has inferior adhesion properties and is susceptible to corrosion on exposure to humidity.

Another issue of concern in the design of thermal control blankets is electrostatic discharge (ESD). Thermal control blankets for applications in space must be designed to have sufficient electrical conductivity to allow discharge of electrostatic charge that would otherwise build up and result in potentially damaging rapid discharge. Germanium films typically have a surface resistance of about 1 megohm/square, which provides reasonable protection from electrostatic charge build-up. On the other hand, silicon films typically have a sheet resistance on the order of 100 megohms/square, and need to be doped with an impurity to increase conductivity. Therefore, from an ESD perspective, germanium is preferred over silicon.

The Roth patent also suggests that the advantages of both materials can be obtained by applying them as multiple separate layers on the substrate. However, the use of multiple coatings on the substrate increases the complexity and cost of the manufacturing process, and poses potential problems arising from the presence of multiple interfaces between dissimilar materials. Ideally, a single thermal coating having the desired properties would be preferred, but neither silicon nor germanium provides the desired properties. Accordingly, there is still room for improvement over the thermal blanket structure disclosed and claimed in the Roth patent. The present invention is directed to this end.

SUMMARY OF THE INVENTION

The present invention utilizes a single homogeneous thermal coating over a substrate and combines the advantages of silicon and germanium. Briefly, and in general terms, the present invention may be defined as a passive thermal control blanket, comprising a substrate; and a coating on the substrate, wherein the coating is a homogeneous mixture of silicon and germanium in proportions selected to combine desirable properties of both materials, and wherein the coating also provides the blanket selected emittive characteristics for infrared energy and reflective characteristics for visible light.

More specifically, the substrate is a plastic substrate. The coating may be formed in any desired proportions of silicon and germanium, but a coating with approximately 5-20% of silicon by weight appears to be close to ideal.

The invention may also be defined as a method for manufacturing a thermal control blanket, the method comprising the steps of taking a plastic substrate; depositing on the substrate a film that is a homogeneous mixture of silicon and germanium, wherein the mixture is formulated to combine advantageous properties of silicon and germanium.

More specifically, the depositing step comprises sputtering the mixture of silicon and germanium onto the substrate. The sputtering step may comprise co-sputtering from separate silicon and germanium targets, or sputtering from a mosaic target having separate silicon and germanium tiles. The mosaic target may be, for example, a circular target with tiles that are radial slices, or a rectangular target with rectangular tiles. The sputtering target may also be comprised of a homogeneous mixture of germanium and silicon.

It will be appreciated from the foregoing summary that the present invention represents a significant advance in the field of passive thermal control blankets. In particular, the invention provides a blanket the combines the advantages of silicon and germanium as a thermal coating. Other aspects and advantages of the invention will become apparent from the following detailed description, taken in conjunction with the accompanying drawings.

DETAILED DESCRIPTION OF THE INVENTION

Figure 1:
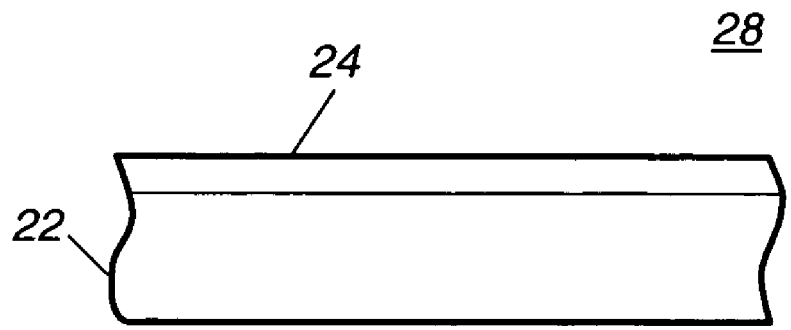
FIG. 1 is simplified cross-sectional view of a fragment of thermal control blanket material.

As shown in the drawings for purposes of illustration, the present invention pertains to passive thermal control blankets. Prior to the present invention, a widely used type of thermal control blanket has been made by coating a substrate with a material that is highly reflective to radiation in the visible spectrum, but able to transmit emitted radiation from beneath the blanket. A germanium coating provides desirably good reflectivity properties but does not easily adhere to the substrate. Silicon adheres to the substrate more readily but does not have reflective properties as good as those of germanium. Layering the two materials one over the other has been suggested as a possible solution but this increases the complexity and cost of the process.

Figure 2:
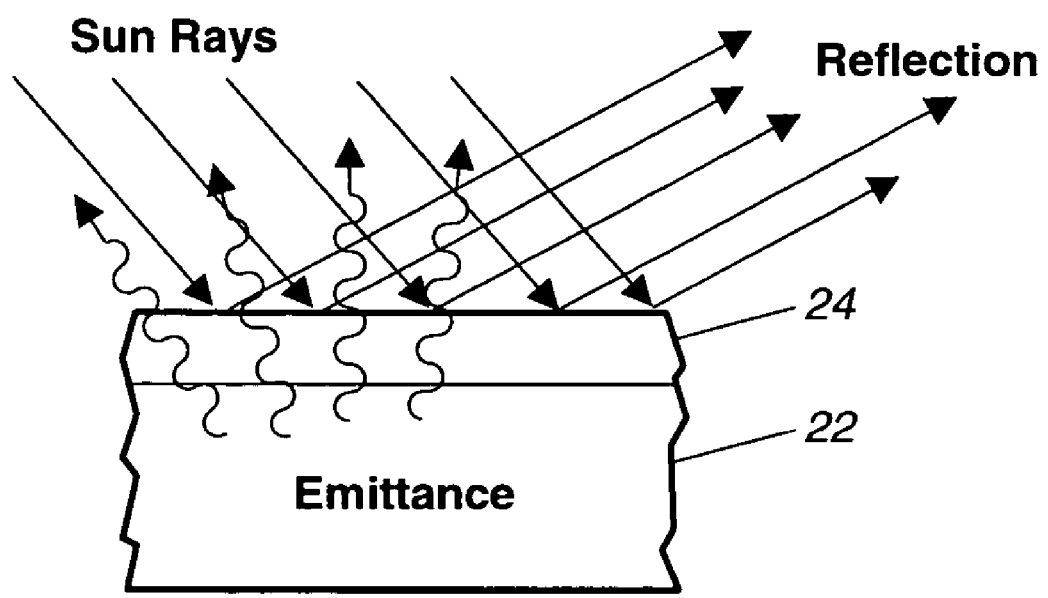
FIG. 2 is a view similar to FIG. 1, but also showing the basic thermal functions of the blanket.

In accordance with the invention, silicon and germanium are coated onto the substrate of a thermal control blanket as a single homogeneous mixture. FIG. 1 shows the cross section of a fragment of a thermal control blanket, indicated generally by reference numeral 28 and comprising a substrate 22 of a plastic material such as Kapton, coated with a thin layer 24 that is a homogeneous mixture of silicon and germanium. As shown in FIG. 2, solar radiation impinging on the layer 24 is largely reflected. Energy that must be radiated through the substrate 22 to maintain a desired heat balance, is transmitted through the layer 24 and radiated away from the blanket.

Using a silicon/germanium mixture or "alloy" for the reflective layer 24 provides blanket having the superior optical reflectivity properties of germanium while retaining the better adhesion and durability of silicon. The mixture also provides electrostatic discharge (ESD) performance close to that of germanium and far superior to that of pure silicon. The proportion silicon to germanium is selected depending on the requirements of a particular application. For example, the use of 5% silicon results in a reflective layer 24 that is very similar to germanium in terms of its reflectivity and ESD properties, but also provides improved adhesion and corrosion properties as a result of the presence of silicon. Increasing the silicon proportion to 10% results in even better adhesion and corrosion properties, but with correspondingly diminished reflectivity. The proportions of the two materials used in a given application will be largely determined by various other design factors, such as the substrate material used, the degree of reflectivity needed in the application, and so forth.

Various techniques can be used to form the layer 24 on the substrate 22, but some type of vacuum deposition technique, such as sputtering, is presently preferred. Sputtering is the deposition of thin films by bombardment of a solid target with energetic ions. The target material is sputtered onto the substrate and forms a uniform film. Sputtering has the advantages of excellent thickness control, high surface quality and relatively low cost. Deposition by thermal evaporation is another possibility, but necessarily exposes the blanket to high temperatures, whereas sputtering provides good adhesion without heating.

Sputtering a mixture of silicon and germanium onto the substrate 22 can be effected in any of several different ways. First, co-sputtering from two separate targets of silicon and germanium may be used. A second, and presently preferred approach is first form a target that is a mosaic of the two materials, as described further below, and then to sputter from this single target. A third approach is to form an "alloyed" target in which silicon and germanium are already mixed homogenously, either by sputtering, thermal spraying, or a controlled crystalline growth of both materials. Since such "alloyed" targets are not readily available, this third approach obviously involves additional processing steps and additional cost.

Figure 3:
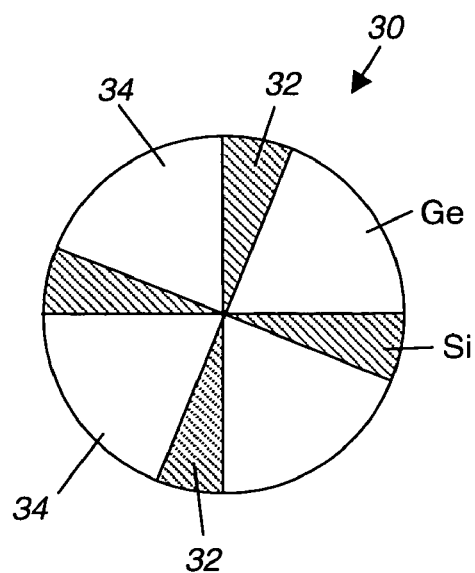
FIG. 3 is plan view of a circular sputtering target used in accordance with an embodiment of the present invention.

FIG. 3 is an example of a circular mosaic target 30, having alternating radial segments of silicon (32) and germanium (34). When the entire target 30 is bombarded with energetic ions, the sputtered material is deposited on the substrate 22 in a uniformly mixed manner and the resulting layer 24 has the desired combination of desirable properties of silicon and germanium.

Figure 4:
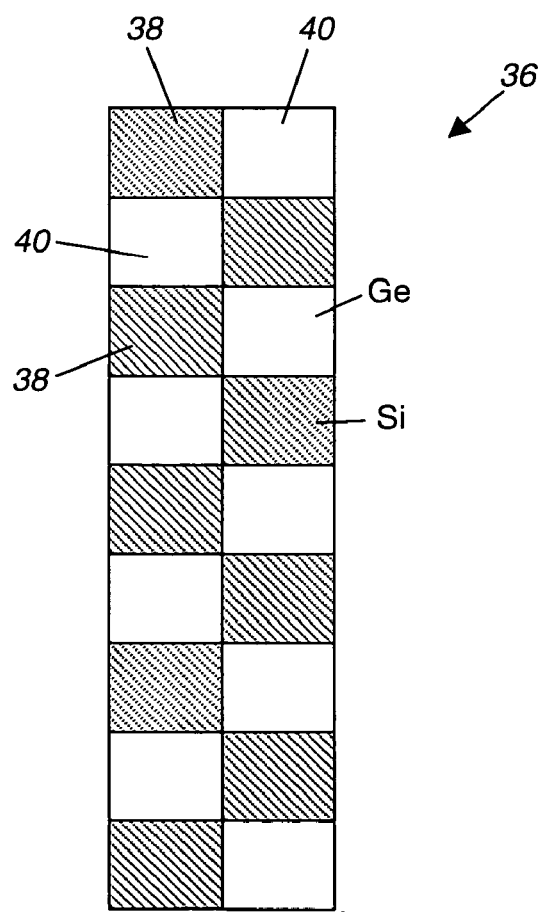
FIG. 4 is a plan view of rectangular sputtering target used in accordance with an alternative embodiment of the present invention.

FIG. 4 is an example of a rectangular mosaic target 36, having a checkerboard pattern of alternating tiles of silicon (38) and germanium (40). The silicon and germanium tiles 38 and 40 are shown as being of uniform size, but they may, of course, be of different sizes, or there may be more tiles of one material than of the other, depending on the ratio of silicon to germanium that is called for in a particular application. Both of these mosaic targets 30 and 36 are formed by cutting tiles of silicon and germanium and then assembling them on a suitable backing material.

It will be appreciated from the foregoing that the present invention represents a significant advance in the field of thermal control blankets. In particular, the invention combines the advantages of silicon and germanium for thermal control. It will also be appreciated that, although specific embodiments of the invention have been described by way of example, various modifications may be made without departing from the spirit and scope of the invention. Accordingly, the invention should not be limited except as by the appended claims.

The invention claimed is:

1. A passive thermal control blanket, comprising:
 a plastic substrate; and
 a coating on the substrate, wherein the coating is a homogeneous mixture consisting of silicon and germanium formulated to combine desirable properties of both materials, and wherein the coating provides the blanket selected emittive characteristics to radiate infrared energy and reflective characteristics for visible light, and wherein the coating on the substrate includes approximately 5-20% by weight of silicon mixed with germanium.

2. The passive thermal control blanket of claim 1, wherein the coating is formed on the substrate by a vacuum deposition process.

3. A method for manufacturing a thermal control blanket, the method comprising:
 taking a plastic substrate;
 depositing on the substrate a film that is a homogeneous mixture consisting of silicon and germanium, wherein the mixture is formulated to combine advantageous properties of silicon and germanium, and wherein the coating on the substrate includes approximately 5-20% by weight of silicon mixed with germanium.

4. The method of claim 3, wherein the depositing step comprises sputtering the mixture of silicon and germanium onto the substrate.

5. The method of claim 4, wherein the sputtering step comprises co-sputtering from separate silicon and germanium targets.

6. The method of claim 4, wherein the sputtering step comprises sputtering from a mosaic target having separate silicon and germanium tiles.

7. The method of claim 6, wherein the mosaic target is circular and the tiles are radial slices.

8. The method of claim 6, wherein the mosaic target is rectangular and the tiles are rectangular.

9. The method of claim 4, wherein the sputtering step results in formation of the film that contains approximately 5-20% by weight of silicon mixed with germanium.

* * * * *